United States Patent
Kini et al.

(10) Patent No.: US 8,848,519 B2
(45) Date of Patent: Sep. 30, 2014

(54) MPLS FAST RE-ROUTE USING LDP (LDP-FRR)

(75) Inventors: Sriganesh Kini, Fremont, CA (US); Srikanth Narayanan, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 214 days.

(21) Appl. No.: 13/113,007

(22) Filed: May 20, 2011

(65) Prior Publication Data

US 2012/0218884 A1  Aug. 30, 2012

Related U.S. Application Data

(60) Provisional application No. 61/449,696, filed on Mar. 6, 2011, provisional application No. 61/447,671, filed on Feb. 28, 2011.

(51) Int. Cl.
  *H04L 1/00* (2006.01)
  *H04L 12/707* (2013.01)
  *H04L 12/723* (2013.01)
  *H04L 12/703* (2013.01)

(52) U.S. Cl.
  CPC ............ *H04L 45/507* (2013.01); *H04L 45/22* (2013.01); *H04L 45/28* (2013.01)
  USPC ...................................................... 370/228

(58) Field of Classification Search
  CPC ...................................................... H04L 45/28
  USPC ...................................................... 370/228
  See application file for complete search history.

(56) References Cited

U.S. PATENT DOCUMENTS

| 7,929,557 B2 * | 4/2011 | Kompella .............. 370/401 |
| 7,969,898 B1 * | 6/2011 | Raj et al. .............. 370/248 |
| 8,259,564 B1 * | 9/2012 | Gredler et al. ........... 370/227 |

(Continued)

OTHER PUBLICATIONS

IETF Draft Submission: Dimitry Haskin, Ram Krishnan, Axiowave Networks Status: A Method for Setting an Alternative Label Switched Paths to Handle Fast Reroute; draft-haskin-mpls-fast-re-route-05.txt, 2001101, No. 5, Nov. 1, 2000 (http://tools.ietf.org/html/draft-haskin-mpls-fast-reroute-05) 11 pages.

(Continued)

*Primary Examiner* — Mark Rinehart
*Assistant Examiner* — Christopher R Crompton
(74) *Attorney, Agent, or Firm* — Blakely Sokoloff Taylor & Zafman LLP

(57) ABSTRACT

MPLS (Multiprotocol Label Switching) fast re-routing using LDP (Label Distribution Protocol) is described. A first network element in a MPLS network receives a first label advertised from a second network element in the MPLS network. The first network element computes a shortest path tree (SPT) to reach a destination network element under a potential failure condition. The second network element is a nexthop of the first network element in the computed SPT and is not upstream from the potential failure condition. The first network element advertises a second label to one or more third network elements for a backup LDP LSP (Label Switched Path) that will serve as a backup when the potential failure condition is realized. The third network element(s) are upstream neighbors on the computed SPT with respect to the first network element. The first network element installs a swap action from the second label to the first label.

20 Claims, 6 Drawing Sheets

(56) References Cited

U.S. PATENT DOCUMENTS

| | | | |
|---|---|---|---|
| 2005/0111351 A1* | 5/2005 | Shen | 370/217 |
| 2007/0036072 A1* | 2/2007 | Raj et al. | 370/225 |
| 2007/0174483 A1* | 7/2007 | Raj et al. | 709/238 |
| 2009/0323521 A1 | 12/2009 | Tochio | |
| 2010/0315943 A1 | 12/2010 | Chao et al. | |
| 2011/0007629 A1* | 1/2011 | Atlas et al. | 370/225 |
| 2012/0243407 A1* | 9/2012 | Li et al. | 370/228 |

OTHER PUBLICATIONS

J. Moy, OSPF Version 2, Network Working Group, Request for Comments: 2328, Apr. 1998, 245 pages.
E. Rosen et al., Multiprotocol Label Switching Architecture, Network Working Group, Request for Comments: 3031, Jan. 2001, 62 pages.
E. Rosen et al., MPLS Label Stack Encoding, Network Working Group, Request for Comments: 3032, Jan. 2001, 24 pages.
P. Pan et al., Fast Reroute Extensions to RSVP-TE for LSP Tunnels, Network Working Group, Request for Comments: 4090, May 2005, 39 pages.
K. Kompella et al., Routing Extensions in Support of Generalized Multi-Protocol Label Switching (GMPLS), Network Working Group, Request for Comments: 4202, Oct. 2005, 28 pages.
L. Andersson et al., LDP Specification, Network Working Group, Request for Comments: 5036. Oct. 2007, 136 pages.
A. Atlas et al., Basic Specification for IP Fast Reroute: Loop-Free Alternates, Network Working Group, Sep. 2008, 32 pages.
M. Shand et al., IP Fast Reroute Framework, Internet Engineering Task Force (IETF), Request for Comments: 5714, Jan. 2010, 16 pages.
S. Kini et al., MPLS Fast Re-route using extensions to LDP, draft-kini-mpls-frr-ldp-01, IETF 81 Quebec City, Jul. 24-29. 2011, 16 pages.
S. Kini et al., MPLS Fast Re-route using extensions to LDP, draft-kini-mpls-frr-ldp-00, IETF 80 Prague, Mar. 27-Apr. 1, 2011, 15 pages.
S. Kini et al., MPLS Fast Re-route using extensions to LDP, draft-kini-mpls-frr-ldp-01, IETF 81 Quebec City, Jul. 24-29, 2011, 14 pages.
S. Kini et al., MPLS Fast Reroute using extensions to LDP draft-kini-mpls-frr-ldp-00.txt, MPLS Working Group, Internet Draft, Mar. 7, 2011, 6 pages.
S. Kini et al., MPLS Fast Re-route using extensions to LDP draft-kini-mpls-frr-ldp-01.txt, MPLS Working Group, Internet Draft, Jul. 11, 2011, 11 pages.
Pan P. et al., "Fast Reroute Extensions to RSVP-TE for LSP Tunnels", Network Working Group, RFC 4090, (May 1, 2005), 36 pages.
Non-Final Office Action for U.S. Appl. No. 13/281,391, dated Dec. 17, 2013.
Final Office Action, U.S. Appl. No. 13/281,391, dated Mar. 21, 2014; 19 pages.

* cited by examiner

MPLS FAST RE-ROUTE USING LDP (LDP-FRR)

CROSS-REFERENCE TO RELATED APPLICATIONS

This application claims the benefit of U.S. Provisional Application No. 61/449,696, filed Mar. 6, 2011, and U.S. Provisional Application No. 61/447,671, filed Feb. 28, 2011, which are hereby incorporated by reference.

FIELD

Embodiments of the invention relate to the field of networking; and more specifically, to MPLS (MultiProtocol Label Switching) Fast-Reroute.

BACKGROUND

Recovering traffic with minimal loss is a fundamental requirement in carrier-class networks. Fast-Reroute (FRR) is a technique to recover traffic with minimal loss under failure conditions in a network.

LDP (Label Distribution Protocol), defined in RFC 5036, is a widely deployed protocol to setup Label Switched Paths (LSPs) in MPLS (MultiProtocol Label Switching) (defined in RFCs 3031 and 3032) implementations. LDP establishes LSPs along routed paths setup by IGP (Interior Gateway Protocol) (defined, for example, in RFC 2328). Thus, the convergence of LSPs established with LDP under failure conditions is gated by IGP convergence.

RSVP-TE (Resource Reservation Protocol-Traffic Engineering) based FRR has been standardized (RFC 4090) and implemented in several vendors platforms. Some operators and vendors have tried to address the fast-convergence of LDP by using RSVP-TE. This feature is typically referred to as LDP-over-RSVP.

Since LDP follows routed paths setup by IGP, its convergence is gated by IGP convergence. However IGP convergence has been traditionally slow. A good description of the problem is in section 4 of RFC 5714. For example, such reasons include: the time taken to detect the failure, the amount of time for the local router to react the failure, the amount of time to transmit the information about the failure to other routers in the network, the amount of time to re-compute the forwarding tables, and the amount of time to download the re-computed forwarding tables into the forwarding hardware. Several approaches have tried to introduce FRR in IGP to improve IGP convergence, but each of them have been plagued by several problems. For example, approaches to solving this problem such as draft-ietf-rtgwg-ipfrr-notvia-addresses-0X has deployment and implementation complexity and hence has not been adopted. Approaches such as Loop Free Alternates (described in RFC 5286) do not have full coverage, hence carriers have reservations in deploying them.

Another approach to providing FRR for LDP LSPs is to use RSVP-TE as a failure-bypass mechanism (LDP-over-RSVP). However, carriers have been slow to deploy RSVP-TE due to several reasons, including the extensive configuration and maintenance experience requirements since an additional, fairly complex protocol such as RSVP-TE is used, leading to increased operating expenses. LDP-over-RSVP also requires the vendor to support many features (such as high availability and reliability) in RSVP-TE that may not be available in many implementations.

BRIEF DESCRIPTION OF THE DRAWINGS

The invention may best be understood by referring to the following description and accompanying drawings that are used to illustrate embodiments of the invention. In the drawings.

SUMMARY

Figure 1:
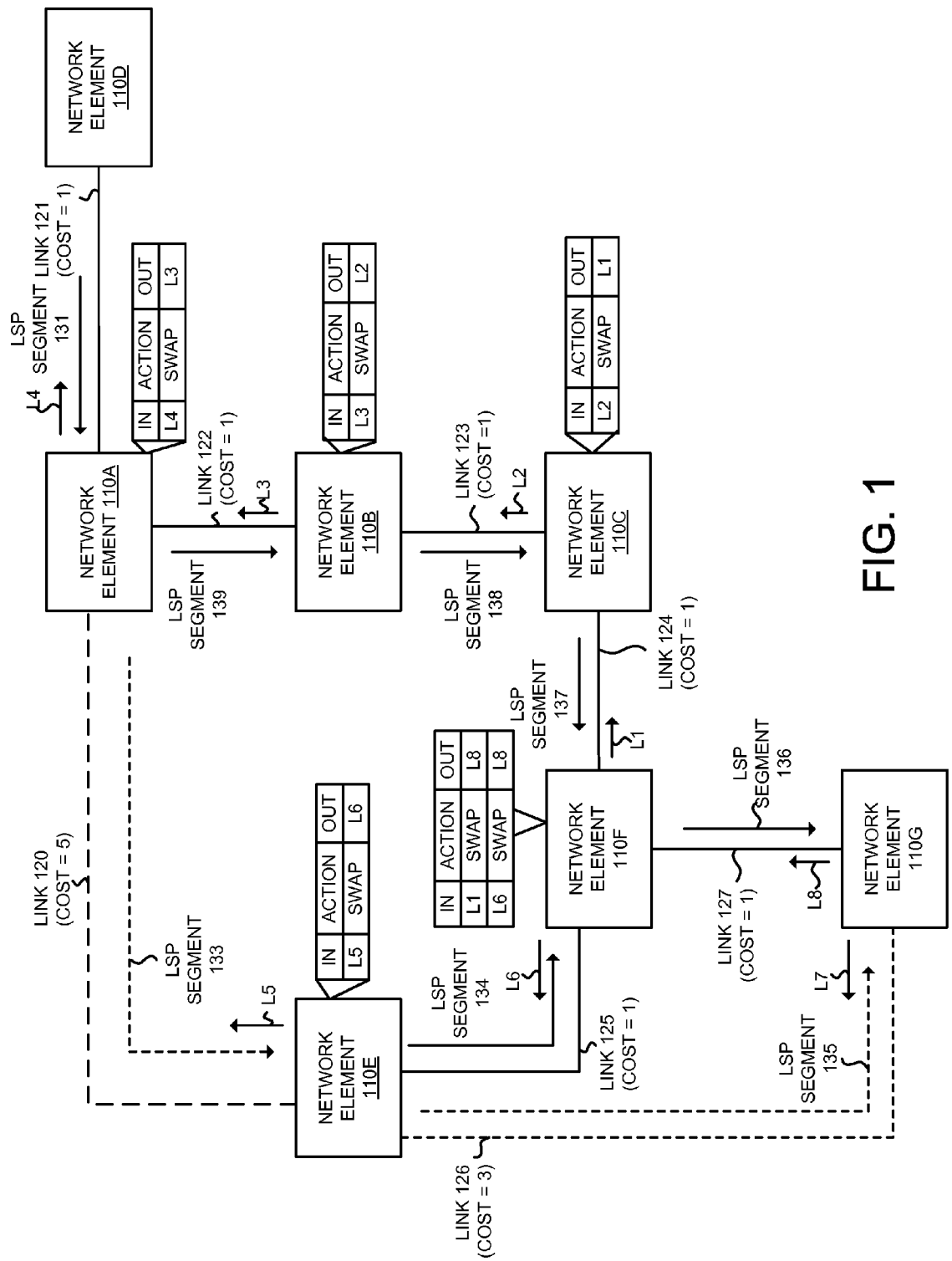
FIG. 1 illustrates an exemplary MPLS network that uses LDP-FRR according to one embodiment.

MPLS (Multiprotocol Label Switching) fast re-routing using LDP (Label Distribution Protocol) is described. An LDP LSP (Label Switched Path) to reach a destination network under a potential failure condition is computed. That computed LDP LSP is merged with a current shortest path LDP LSP at that one of the plurality of network elements that is the first network element along the computed LDP LSP that has a nexthop to the current shortest path LDP LSP.

In one embodiment, a first network element in an MPLS network receives a first label advertised from a second network element in the MPLS network. The first network element computes a shortest path tree (SPT) to reach a destination network element under a potential failure condition. The second network element is a nexthop of the first network element in the computed SPT and is not upstream from the potential failure condition. The first network element advertises a second label to one or more third network elements for a backup LDP LSP that will serve as a backup when the potential failure condition is realized. The third network element(s) are upstream neighbors on the computed SPT with respect to the first network element. The first network element installs a swap action from the second label to the first label. In this embodiment, the first network element is a backup switched path merge point.

In one embodiment, a first network element in an MPLS network computes an SPT to reach a destination network element under a potential failure condition. The first network element receives a label from a second network element for a backup LDP LSP that will serve as a backup when the potential failure condition is realized. The second network element is an upstream neighbor on the computed SPT with respect to the first network element. The first network element installs a failure trigger action for the potential failure condition to cause the received label to be used when sending traffic to the second network element when the potential failure condition is realized in order to re-route traffic around the failure. Responsive to detecting a failure condition that corresponds with the potential failure condition, traffic received from the second network element destined for the destination network element is rerouted back to the second network element using the received label for the backup LDP LSP. In this embodiment, the first network element is a Point of Local Repair.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In one embodiment of the invention, fast-reroute for LDP LSPs is provided without depending on IGP fast-convergence, IP-FRR, or RSVP-TE based FRR. Since LDP has very simple and easy configuration procedures that has led to its current wide adoption, an implementation that adopts embodiments of the invention can retain the simple configuration model. In most circumstances a carrier will not have to change any operational procedures to an implementation of embodiments of this invention. Thus, embodiments of the invention retain the simplicity of operating LDP and overcomes the complexity of IP-FRR and LDP-over-RSVP while providing coverage in all fault scenarios.

In one embodiment, a network element computes an LSP to reach the destination under a potential failure condition. This LSP is merged with the current shortest path LSP at the first node along the path where the merge is possible. This minimizes the number of extra labels required and also ensures that there is no traffic churn when IGP reconverges.

The following terminology is used to describe embodiments of the invention. A PLR (Point of Local Repair) is the head-end LSR (Label Switch router) of a backup-switched path (BSP) LSP. The PLR is the node that detects a failure and repairs the failure of the link or node by sending traffic on an alternate route (the BSP LSP). The BSP LSP is an LDP LSP that provides a backup for a specific failure entity on the shortest path LDP LSP. The failure entity may be a link, a node, or a SRLG. The BSP LSP originates from the PLR(s). A Backup Switched Path Merge Point (BSP-MP) is an LSR where the BSP LSP is label switched to a label allocated for the shortest path LDP LSP. The BSP-MP need not be downstream of the potential failure. An exclude-SPT (Shortest Path Tree) is the shortest path tree from a PLR to a FEC (Forwarding Equivalence Class) when a particular failure point is excluded from the network.

For a given failure point on the shortest path tree towards a FEC, an LSR upstream of that failure point acts as a BSP-MP and advertises a label for the BSP LSP (referred herein as an alternate label since the LSP will not be taken unless the failure occurs) if that LSR is on an exclude-SPT for that FEC from a PLR of the failure point, and that LSR belongs on the shortest path LDP LSP to that FEC that does not traverse the failure point. The BSP-MP advertises the alternative label for the BSP LSP along the exclude-SPT.

If the shortest path from the PLR to the BSP-MP is not contained in the Exclude-SPT, then each of the intermediate LSRs allocate an alternate label for the BSP LSP and install label swap operations in their forwarding structure(s) (e.g., their ILM (Incoming Label Map)).

The PLR installs a failure action such that upon the failure occurring, the LSP is switched to the BSP LSP for that FEC. In one embodiment, preference is given to a node failure over a link failure. If a BSP LSP is not available for the FEC for the failure, but a BSP LSP to the next-hop or the next-next-hop is available, then it used by pushing the corresponding label on to the label stack.

In one embodiment, after a failure, the BSP LSPs corresponding to the topology before the failure should be removed after a short delay.

FIG. 1 illustrates an exemplary MPLS network that uses LDP-FRR according to one embodiment. The network illustrated in FIG. 1 includes the network elements 110A-G. Each of the network elements acts as a LSR. The network element 110A is coupled with the network elements 110B, 110D, and 110E over the links 122, 121, and 120 respectively. The network element 110B is further coupled with the network element 110C over the link 123. The network element 110C is further coupled with the network element 110F over the link 124. The network element 110F is further coupled with the network elements 110E and 110G over the links 125 and 127 respectively. The links 121, 122, 123, 124, and 125 each have a cost of 1. The link 120 has a cost of 5 and the link 126 has a cost of 3.

FIG. 1 illustrates a number of LSP segments that have been established between the network elements. In one embodiment, the LSP segments have been established using LDP. For example, the network element 110A advertises a label L4 to the network element 110D as part of establishing the LSP segment 131. The network element 110B advertises a label L3 to the network element 110A as part of establishing the LSP segment 139. The network element 110C advertises a label L2 to the network element 110B as part of establishing the LSP segment 138. The network element 110F advertises a label L1 to the network element 110C as part of establishing the LSP segment 137 and advertises a label L6 to the network element 110E as part of establishing the LSP segment 134. The network element 110G advertises a label L8 to the network element 110F as part of establishing the LSP segment 136, and advertises a label L7 to the network element 110E as part of establishing the LSP segment 135. The network element 110E advertises a label L5 to the network element 110 as part of establishing the LSP segment 133. The network element 110F advertises a label L6 to the network element 110E as part of establishing the LSP segment 134.

FIG. 1 also illustrates a shortest path tree. For example, traffic from the network element 110D to the network element 110G takes the following path: 110D→110A→110B→110C→110F→110G. Traffic from the network element 110D to the network element 110G does not travel through the network element 110E because the cost of the link 120 (which is 5) causes it to be a less preferred path. Thus, the link 120 and the LSP segment 133 have been illustrated as dashed lines because they are not part of the SPT to the network element 110G. The link 126 and the LSP segment 135 are also illustrated as dashed lines because they are not part of an SPT from the network element 110E to the network element 110G.

The network elements include forwarding structures to perform the label switching. For example, the network element 110A includes forwarding structure(s) that specify that when it receives a packet having the label L4 from the network element 110D, it is to swap the label L4 with the label L3 and transmit the packet to the network element 110B. In one embodiment, the forwarding structures include ILM (incoming label map) and NHLFE (next hop label forwarding entry) data structures.

In one embodiment, the network elements illustrated in FIG. 1 compute BSP LSPs for a number of potential failures in case that the failures occur. The number of BSP LSPs that are created for alternative paths is kept at a minimum as some regular LSP segments (LSP segments that are established for non-failure scenarios) can be used. For example, a network element that is acts as a BSP-MP for a particular failure can merge a BSP-LSP with an established LSP to re-route the failure.

The following terminology is used to describe the operations performed by the network elements to establish the LDP FRR.

1. A directed graph is denoted by G. Nodes are denoted by S, D, N, M, O, and P. Links are denoted by L, K, J, and I.
2. All links in G have cost>0.
3. Node (G, D) denotes a node D in graph G.
4. SPT stands for shortest path tree (as computed by, for example, Dijkstra's algorithm).
5. SPT(G, S) denotes a SPT from node S (in graph G) to all other nodes in G. Note that SPT(G, D) is a directed acyclic graph (DAG) and is of course a graph.
6. PairSPT(G, S, D) denotes the SPT between a pair of nodes from S to D in G.
7. PairSPT(G, S, D, D1, D2, . . . ) denotes the shortest path from S to reach anyone of D, D1, D2, . . . .
8. ToSPT(G, D) is the shortest path tree to a node D (as computed by, for example, Dijkstra's algorithm) in graph G from all other nodes in G. Note that toSPT(G, D) is also a DAG similar to SPT(G,S), and is of course a graph.
9. Link (G, L) denotes a directed link L in graph G.
10. UpNode(G, L) denotes a node in graph G that is at the upstream end of link L.
11. DnNode(G, L) denotes a node in graph G that is at the downstream end of L.
12. Note that UpNode(toSPT(G, D), L) would be a node that would repair a fault in L by sending traffic on an alternate route. This is typically referred to as the Point of Local Repair (PLR) for repairing a fault in L. Also note that DnNode(toSPT (G, D), L) would be a node that traffic merges back when link protection is done by PLR for the directly connected LDP peer and label stacking is used.
13. Upstr(G, D, L) denotes a subtree of a G that consists of all nodes that are upstream of L in toSPT(G, D) and all links between those nodes. If L does not belong to toSPT(G, D) then it is a NULL graph. Note that upstr is a graph, but not necessarily a DAG.
14. G-L denotes the graph G without link L.
15. G-F denotes a subset of graph G. Here F is a set of links and nodes (with their attached links) from G. F is removed from G to give G-F.

In a connected graph G, for any link L in the toSPT(G, D), (for any D), there exists a node in upstr(G, D, L) with a link other than L to a node in G but not in upstr(G, D, L) if there exists a path from UpNode(L) to D in G-L. If there does not exist such a node, then the link L is a cut-edge of the graph G and there is no path from UpNode(G, L) to D in G-L. The goal is to number of new LSPs created for alternative paths and keep the LDP philosophy of routing along the shortest path.

In one embodiment, each of the network elements 110A-G perform the following to establish fast-routing for LDP LSPs in a single link failure case.

1. For every D in G, do the following
   a. Compute the toSPT(G, D)
   b. For every link L in toSPT(G, D), do the following:
      i. Compute toSPT(G-L, D);
      ii. If a node is in upstr(G, D, L) and belongs to pairSPT (G-L, UpNode(G, D, L), D), then allocate (and distribute) a label for D (called Alternate Label or AL) to upstream neighbors in pairSPT. Setup ILM (incoming label map) entries as follows:
         1. If this node has a nexthop in the above-mentioned pairSPT that is not in above-mentioned upstr then it installs a swap action for the allocated AL to the label received from the peer.
         2. Else it allocates a swap action from the AL it has allocated to the AL received from downstream LDP peers in the pairSPT.
         3. UpNode(G, D, L) which is the PLR, installs a failure trigger action for L, where if link L fails then instead of using the label allocated by DnNode(G, D, L) it uses AL and forwards the packet as indicated by ILM.
         4. If AL is not received for D but has been received for the loopback address of DnNode(G, D, L) then setup the failure action to stack that label and forward packet accordingly.

The complexity for the procedure described above with respect to a single link failure is $O(N^4)$, but is believed that it can be done in $O(N^3)$.

Figure 2:
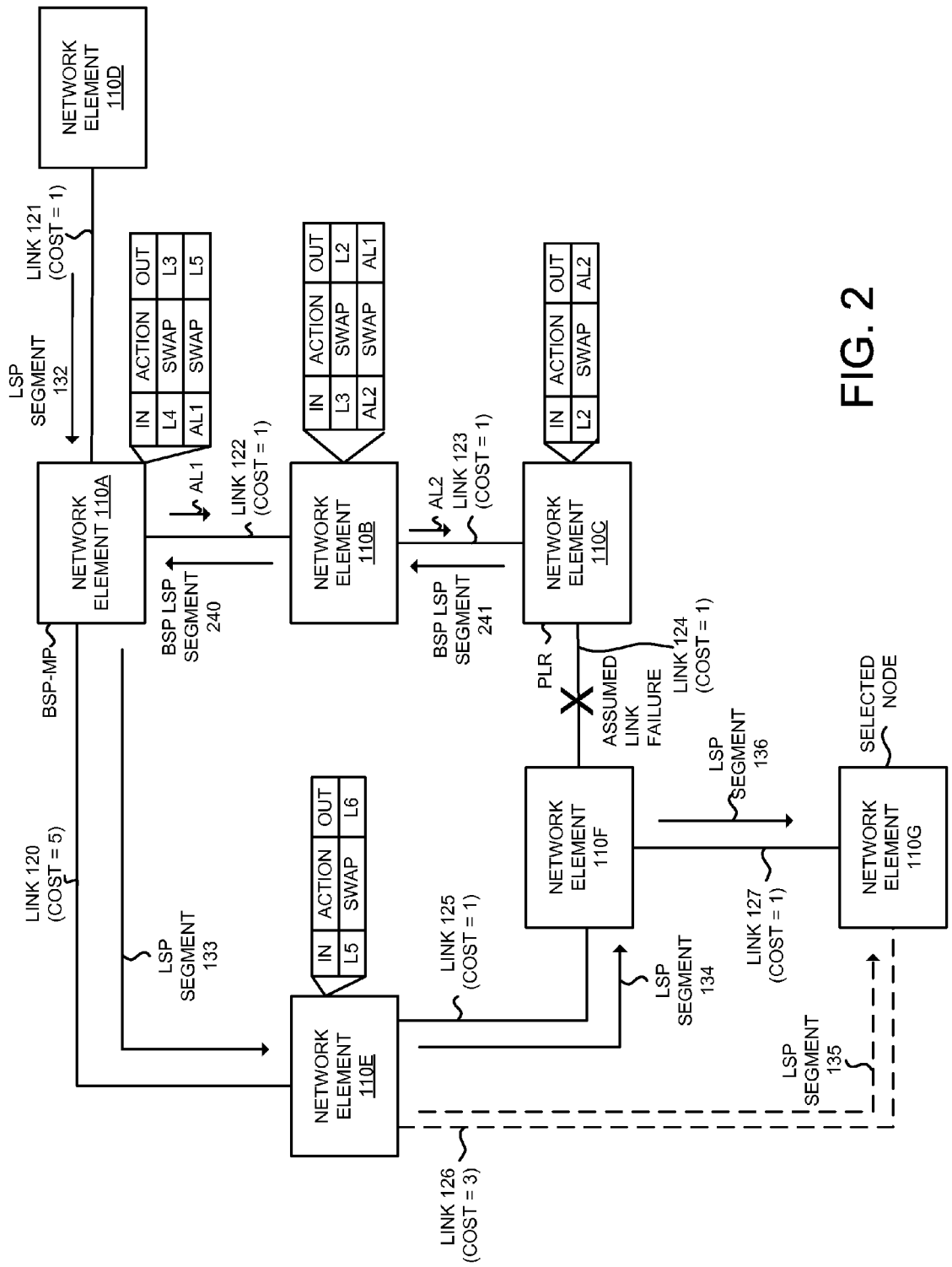
FIG. 2 illustrates the network of FIG. 1 where the network elements configure a BSP LSP to reach a given destination network element over a potential failure of a link according to one embodiment.
Figure 3:
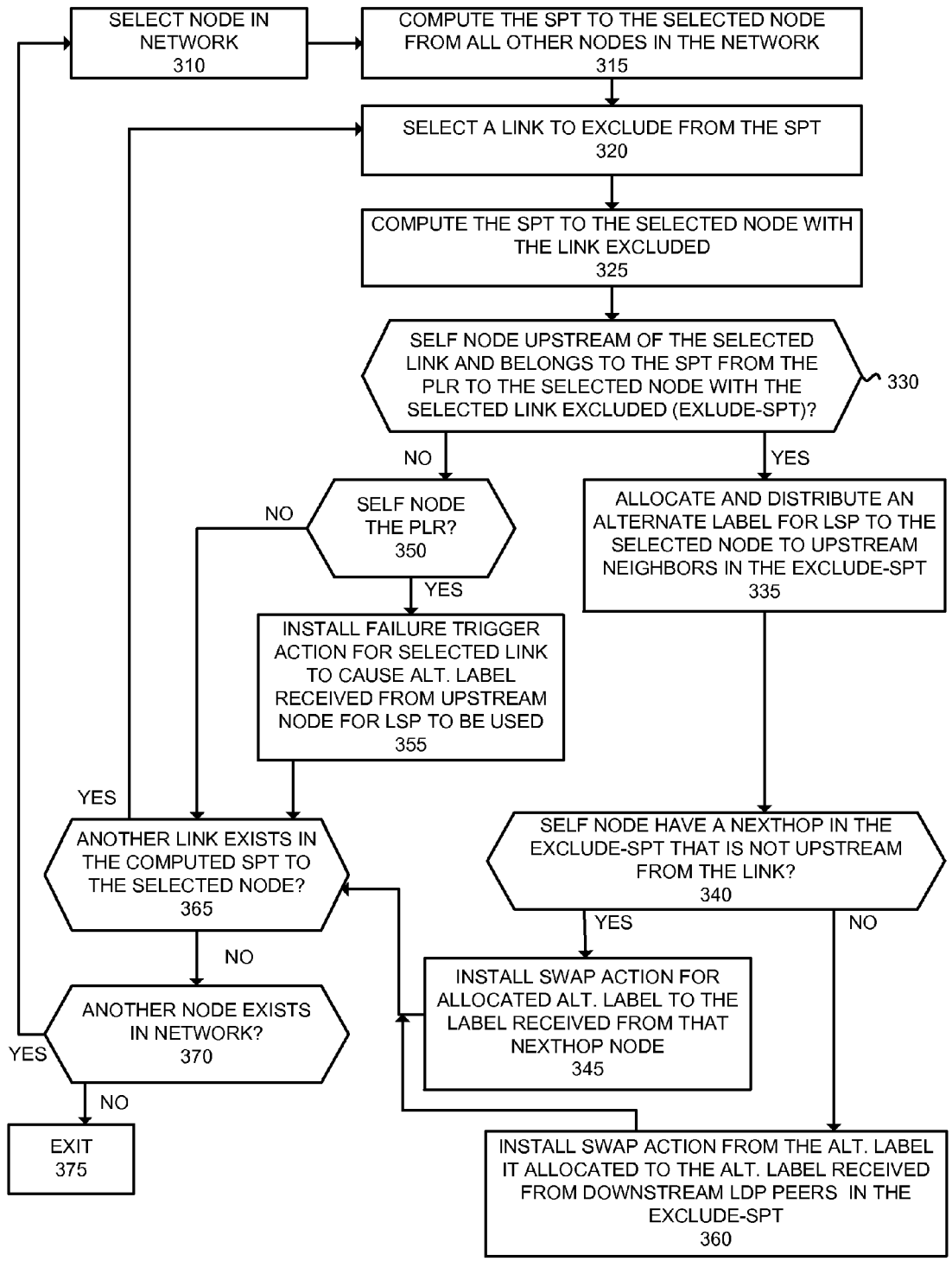
FIG. 3 is a flow diagram illustrating exemplary operations for configuring LDP-FRR for a single link failure according to one embodiment.

FIG. 2 illustrates the network of FIG. 1 where the network elements configure a BSP LSP to reach the destination network element 110G over a potential failure of the link 124. FIG. 2 will be described with respect to the FIG. 3, which is a flow diagram illustrating exemplary operations for configuring LDP FRR according to one embodiment. In one embodiment, each of the network elements 110A-G perform the operations described in FIG. 3.

At operation 310, one of the nodes (one of the network elements 110A-G) is selected. With respect to FIG. 2, the selected node is the network element 110G. Flow then moves to operation 315 and a SPT is computed to the selected node 110G from all other nodes in the network. Flow then moves to operation 320 and a link is selected to exclude from the computed SPT. With respect to FIG. 2, the selected link to exclude is the link 124. Flow then moves to operation 325 and the SPT to the selected node is computed with the selected link excluded. Thus, the SPT is calculated to the selected node assuming that the selected link is not part of the network.

Flow then moves to operation 330 where a determination is made whether the network element performing the calculation is upstream of the selected link and belongs to the SPT from the point of local repair (PLR) to the selected node with the selected link excluded. The SPT from the PLR to the selected node with the selected link is referred herein with respect to the operations of FIG. 3 as the exclude-SPT.

With reference to FIG. 2, the PLR is the network element 110C. The nodes upstream of the selected link include the network elements 110A, 110B, and 110D. The nodes that belong to the exclude-SPT are the network elements 110A and 110B (network element 110D is not part of the exclude-SPT). If the network element performing the calculation is upstream of the selected link and belongs to the SPT from the PLR to the second node with the selected link excluded, then flow moves to operation 335; otherwise flow moves to operation 350.

At operation 335, the network element performing the calculation allocates and distributes (e.g., using LDP) a label for a BSP-LSP to the selected node to upstream neighbors in the exclude-SPT. For example, with reference to FIG. 2, the network element 110A allocates and distributes the alternative label AL1 to the network element 110B as part of establishing the BSP-LSP segment 240 and the network element 110B allocates and distributes the alternative label AL2 to the network element 110C as part of establishing the BSP-LSP segment 241. Flow then moves to operation 340.

At operation 340, if the network element that is performing the operations has a nexthop in the exclude-SPT that is not upstream from the selected link (the link that has been excluded), then flow moves to operation 345 (the network element is the merge point), otherwise flow moves to operation 360. To say it another way, if the network element is on the exclude-SPT and belongs on the shortest path LDP LSP to the selected node that does not traverse the failure point, then it is a merge point and flow would move to operation 345. With respect to FIG. 2, the network element 110A has a nexthop in the exclude-SPT that is not upstream from the link 124 (which is the network element 110E).

At operation 345, the network element installs a swap action for the alternative label it has allocated and distributed to the label received from that nexthop network element. For example, with respect to FIG. 2, the network element 110E installs a swap action for the alternative label AL1 to the label L5 previously received from the network element 110E. Thus, the network element 110E, which is acting as the BSP-MP in this example, merges the BSP-LSP that is being established to re-route around the failure of the link 124 with the current shortest path LSP. This minimizes the number of extra alternative labels required and also ensures that there is no traffic churn when IGP reconverges. Flow moves from operation 345 to operation 365.

At operation 350, if the network element that is performing the operations is the PLR, then flow moves to operation 355, otherwise flow moves to operation 365. At operation 355, the network element installs a failure trigger action for the selected link (which is excluded) to cause the alternative label that it has received from an upstream neighbor to be used. For example, with respect to FIG. 2, the network element 110C, which is acting as the PLR, installs a failure trigger action such that upon the failure of the link 124 occurring, the network element 110C will cause traffic arriving from the network element 110B with the label L2 to be sent along the BSP LSP segment 241 (e.g., by changing one or more entries in its forwarding structure(s)). In one embodiment, only the PLR needs to take action upon a failure occurring by causing the traffic to be sent along the BSP LSP. Flow moves from operation 355 to operation 365.

At operation 360, since the network element is not the BSP-MP but is upstream of the selected link and belongs to the exclude-SPT, then it is an intermediate node along the exclude-SPT and therefore installs a swap action from the alternative label it allocated and distributed for the BSP-LSP to the alternative label for the BSP-LSP received from a downstream LDP peers in the exclude-SPT. For example, with respect to FIG. 2, the network element 110B installs a swap action from the alternative label AL2 it has allocated and distributed to the network element 110C to the alternative label AL1 it has received from the network element 110A. Flow moves from operation 360 to operation 365.

At operation 365, it is determined whether another link exists in the computed SPT to the selected node. If another link exists, then flow moves back to operation 320 and another link is selected to be excluded from the computed SPT. If another link does not exist, then flow moves to operation 370 where it is determined whether another node exists in the network. If another node does exist in the network, then flow moves back to operation 310 where another node is selected. If another node does not exist, then flow moves to operation 375 and the process exits.

In one embodiment, the alternative labels are distributed not for the selected node, but for the loopback address of the node that is at the downstream end of the selected link. For example, with reference to FIG. 2, the alternative labels may be distributed for the network element 110F, which is at the downstream end of the selected link. In such circumstances, the failure action is setup to stack that label and forward the packet accordingly.

In one embodiment, a network element performs fast-reroute for LDP LSPs in a node failure case as follows:

Node Failure Case:
1. For every D in G, do the following:
   a. Compute the toSPT(G, D)
   b. Let F denote a node M in G along with all its links. Let M1, M2, . . . Mn denote the directly connected nodes that are upstream to M in toSPT(G, D). Let N1, N2, . . . Nn denote the directly connected nodes that are downstream to M in toSPT(G, D). For every such F, do the following:
      i. Compute toSPT(G-F, D)
      ii. If a node is in upstr(G, D, F) and belongs to pairSPT (G-F, Mi, D), for any i (1, . . . , n) then allocate (and distribute) a label for D (called Alternate Label or AL) to upstream neighbors in pairSPT. Setup ILM entries as follows:
         1. If this node has a nexthop in the above-mentioned pairSPT that is not in above-mentioned Upstr then it installs a swap action for the allocated AL to the label received from the peer.
         2. Else it allocates a swap action from the AL it has allocated to the AL received from downstream LDP peers in the pairSPT.
         3. UpNode(G, D, F) which is the PLR, installs a failure trigger action for L, where if link L fails then instead of using the label allocated by DnNode(G, D, L) it uses AL and forwards the packet as indicated by ILM.
         4. If AL has not been received for D but has been received for any of the next-next-hop LSRs loop back address (next-next-hop can be deduced from toSPT) then swap the label with that allocated by the next-nexthop (signaling extension for this is defined later) and then stack the AL for the next-next-hop.

Figure 4:
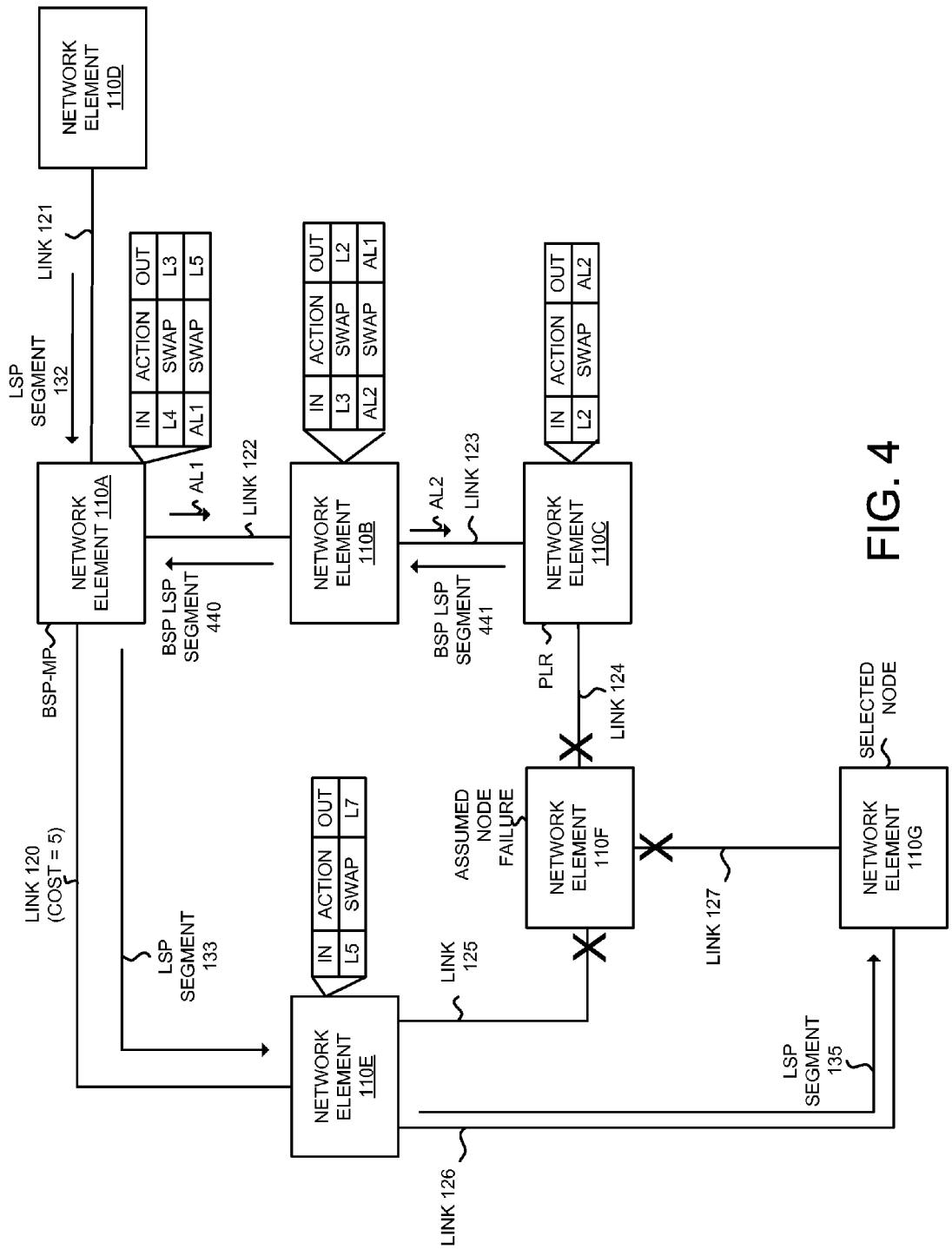
FIG. 4 illustrates the network of FIG. 1 where the network elements configure a BSP LSP to reach a given destination network element over a potential failure of a network element according to one embodiment.
Figure 5:
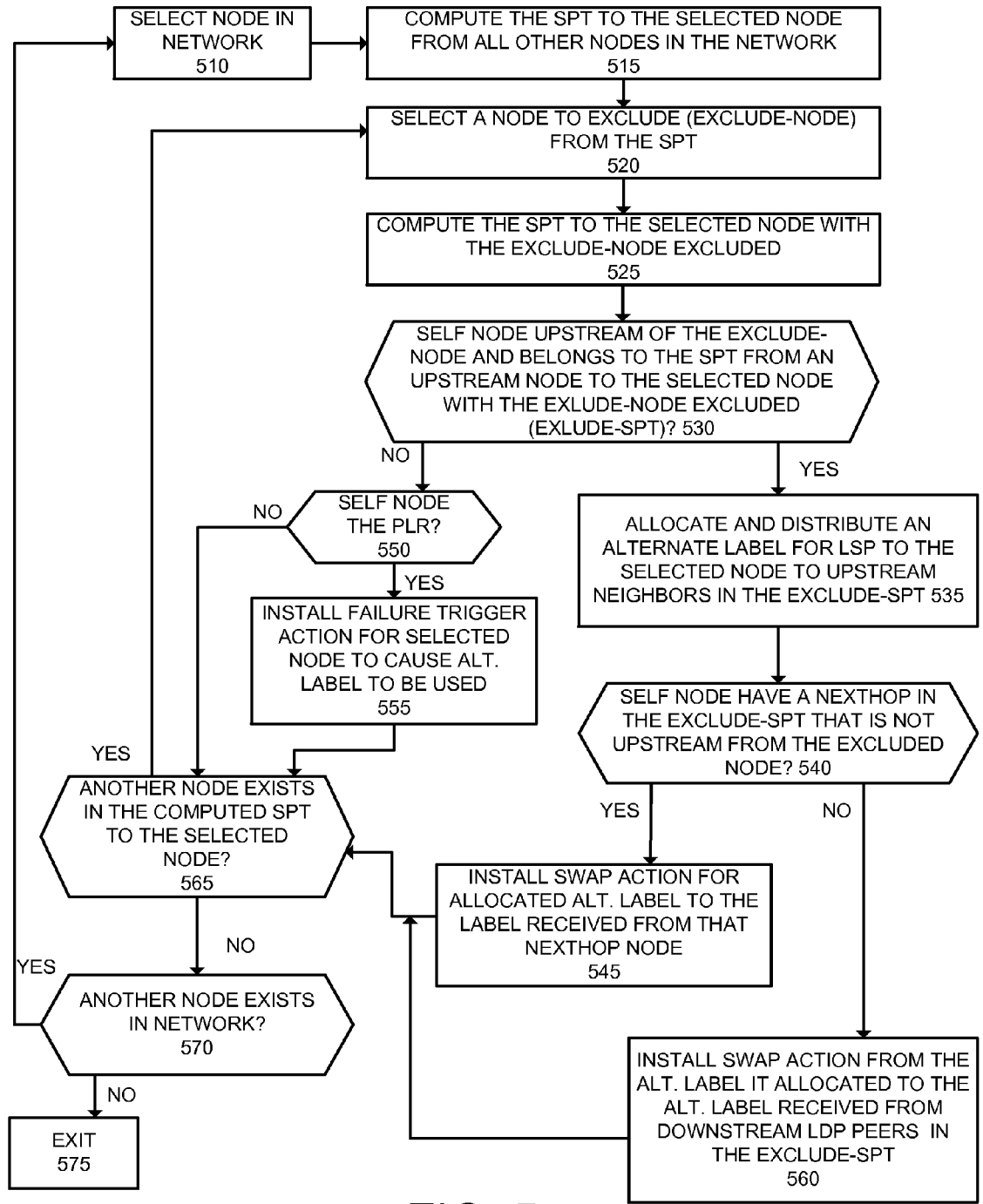
FIG. 5 is a flow diagram illustrating exemplary operations for configuring LDP-FRR for a single node failure according to one embodiment.

FIG. 4 illustrates the network of FIG. 1 where the network elements configure a BSP LSP to reach the destination network element 110G over a potential failure of the network element 110F. FIG. 4 will be described with respect to the FIG. 5, which is a flow diagram illustrating exemplary operations for configuring LDP FRR in case of a single node failure according to one embodiment. In one embodiment, each of the network elements 110A-G perform the operations described in FIG. 5.

At operation 510, one of the nodes (one of the network elements 110A-G) is selected. With respect to FIG. 4, the selected node is the network element 110G. Flow then moves to operation 515 and a SPT is computed to the selected node 110G from all other nodes in the network. Flow then moves to operation 520 and a node is selected to exclude from the computed SPT. With respect to FIG. 4, the selected node to exclude is the network element 110F, which is referred herein as the exclude-node. Flow then moves to operation 525 and the SPT to the selected node is computed with the exclude-node excluded. Thus, the SPT is calculated to the selected node assuming that the exclude-node is not part of the network.

Flow then moves to operation 530 where a determination is made whether the network element performing the calculation is upstream of the exclude-node and belongs to the SPT from an upstream node to the selected node with the exclude-node excluded. The SPT from an upstream node to the selected node with the exclude-node excluded is referred herein with respect to the operations of FIG. 5 as the exclude-SPT. With reference to FIG. 4, an upstream node is the network element 110C. If the network element performing the calculation is such a node, then flow moves to operation 535; otherwise flow moves to operation 550.

At operation 535, the network element performing the calculation allocates and distributes (e.g., using LDP) a label for a BSP-LSP to the selected node to upstream neighbors in the exclude-SPT. For example, with reference to FIG. 4, the network element 110A allocates and distributes the alternative label AL1 to the network element 110B as part of establishing the BSP-LSP segment 440 and the network element 110B allocates and distributes the alternative label AL2 to the network element 110C as part of establishing the BSP-LSP segment 441. Flow then moves to operation 540.

At operation 540, if the network element that is performing the operations has a nexthop in the exclude-SPT that is not upstream from the excluded node, then flow moves to operation 545 (the network element is the merge point), otherwise flow moves to operation 560. To say it another way, if the network element is on the exclude-SPT and belongs on the shortest path LDP LSP to the selected node that does not traverse the failure point, then it is a merge point and flow would move to operation 545. With respect to FIG. 4, the network element 110A has a nexthop in the exclude-SPT that is not upstream from the network element 110F (which is the network element 110E).

At operation 545, the network element installs a swap action for the alternative label it has allocated and distributed to the label received from that nexthop network element. For example, with respect to FIG. 4, the network element 110E installs a swap action for the alternative label AL1 to the label L5 previously received from the network element 110E. Thus, the network element 110E, which is acting as the BSP-MP in this example, merges the BSP-LSP that is being established to re-route around the failure of the node 110F with the current shortest path LSP. This minimizes the number of extra alternative labels required and also ensures that there is no traffic churn when IGP reconverges. Flow moves from operation 545 to operation 565.

At operation 550, if the network element that is performing the operations is the PLR, then flow moves to operation 555, otherwise flow moves to operation 565. At operation 555, the network element installs a failure trigger action for the selected link to cause the alternative label that it has received from an upstream neighbor to be used. For example, with respect to FIG. 4, the network element 110C, which is acting as the PLR, installs a failure trigger action such that upon the failure of the node 110F occurring, the network element 110C will cause traffic arriving from the network element 110B with the label L2 to be sent along the BSP LSP segment 441 (e.g., by changing one or more entries in its forwarding structure(s)). In one embodiment, only the PLR needs to take action upon a failure occurring by causing the traffic to be sent along the BSP LSP. Flow moves from operation 555 to operation 565.

At operation 560, since the network element is not the BSP-MP but is upstream of the selected node and belongs to the exclude-SPT, then it is an intermediate node along the exclude-SPT and therefore installs a swap action from the alternative label it allocated and distributed for the BSP-LSP to the alternative label for the BSP-LSP received from a downstream LDP peers in the exclude-SPT. For example, with respect to FIG. 4, the network element 110B installs a swap action from the alternative label AL2 it has allocated and distributed to the network element 110C to the alternative label AL1 it has received from the network element 110A. Flow moves from operation 560 to operation 565.

At operation 565, it is determined whether another node that can potentially fail exists in the computed SPT to the selected node. If such a node exists, then flow moves back to operation 520 and another node is selected to be excluded from the computed SPT. If another node does not exist, then flow moves to operation 570 where it is determined whether another destination node exists in the network. If another destination node does exist in the network, then flow moves back to operation 510 where another node is selected. If another destination node does not exist, then flow moves to operation 575 and the process exits.

In one embodiment, the alternative labels are distributed not for the selected destination node, but for the loopback address of any of the next-next-hop LSRs. In such circumstances, the label that is allocated by that next-next-hop is swapped and the alternative label for the next-next-hop is stacked.

In one embodiment, SRLG (Shared Risk Link Group) failures are addressed in a similar way as node failure.

In some circumstances, there may be complex cases of links belonging to multiple SRLGs with a relationship that cannot deduce the specific SRLG that has failed and yet an alternate path exists but is not computed. These complex cases are not addressed by the above description.

In some circumstances a heterogeneous network may exist where different LSRs may have different label forwarding table capacity limitations. In such circumstances, it is possible that some LSRs may not have enough label forwarding entries to accommodate the extra labels (ALs) needed for these procedures. In this case, the ALs are allocated only for the loopback address and label stacking is used to label-switch the packet to the nexthop.

LSP Setup Modes

1. All nodes do the computation and allocate labels downstream-unsolicited.

2. PLR does computation of Alt-LSP and signals LSP via explicit path. Upstream on-demand mode.

In one embodiment, signaling extensions are defined to establish the LDP FRR. The signaling extensions allow the BSP-MP to signal to the PLR that a BSP LSP needs to be setup and that the BSP LSP is for when a particular failure happens. Thus, the signaling extensions identify a node to which the backup LSP is to be setup and identifies a failure for which the backup LSP is setup.

For example, the following signaling extensions are defined to establish the LDP FRR:

1. A new TLV is defined (MUST be enabled along with Path vector TLV). This new TLV records labels for the LSP similar to how the Path Vector TLV records LSR Ids along the path. The new TLV may be called "Label Vector TLV".

2. A new optional TLV that contains a list of prefixes (covers Links (p2p and multi-access) and Nodes) and SRLGs. This new optional TLV is used in the Label Map and Label Request messages. The new optional TLV may be called "Topology Exclude TLV".

An implementation that adopts embodiments of the LDP FRR process described herein can retain the simple configuration model of LDP. Thus, embodiments of the invention retain the simplicity of operating LDP and overcomes the complexity of IP-FRR and LDP-over-RSVP while providing coverage in all fault scenarios.

Figure 6:
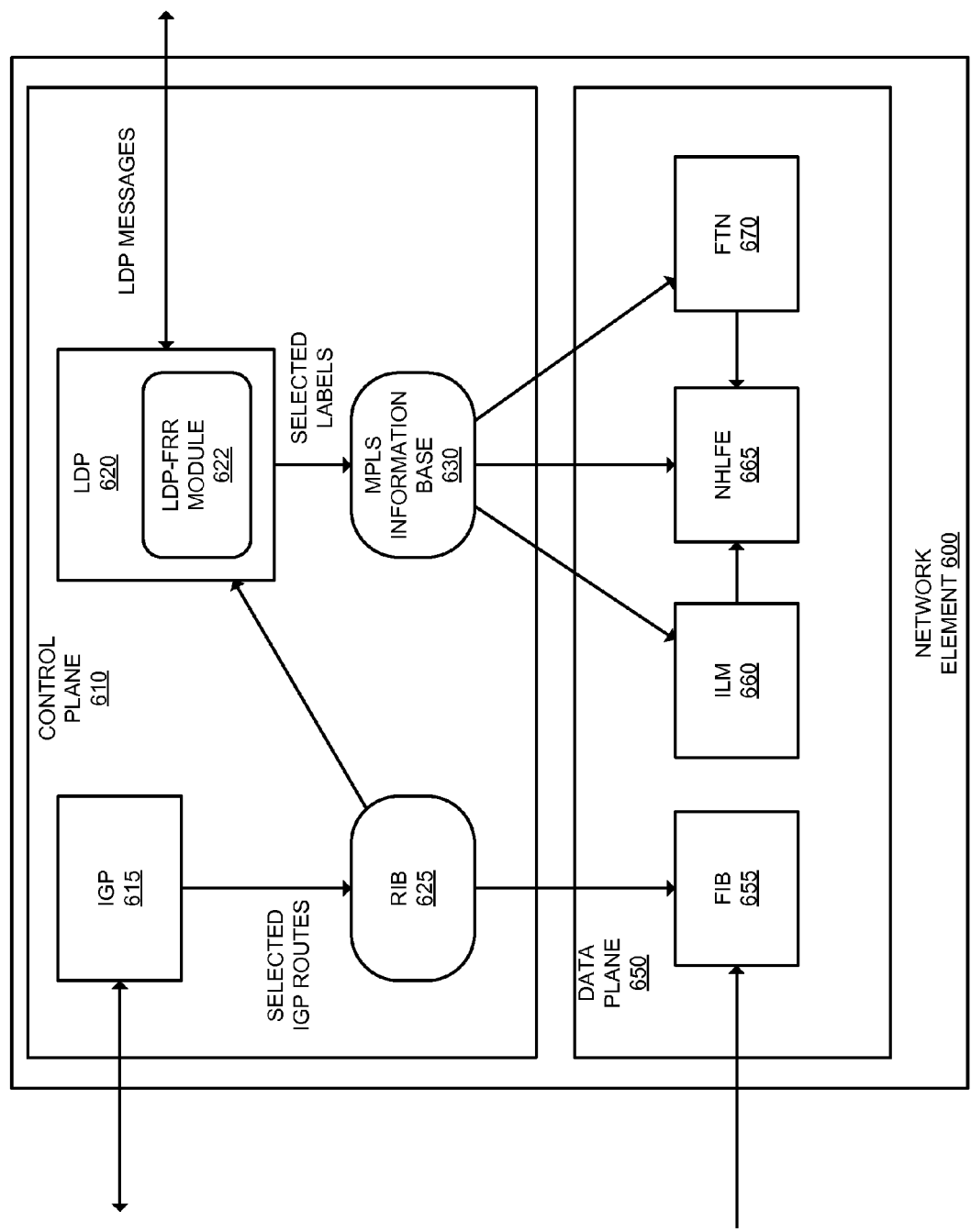
FIG. 6 illustrates an exemplary network element that implements LDP FRR according to one embodiment.

FIG. 6 illustrates an exemplary network element that implements LDP FRR according to one embodiment. The network element 600 includes the control plane 610 and the data plane 650 (sometimes referred to as a forwarding plane or a media plane). The control plane 610 determines how data (e.g., packets) is routed (e.g., the next-hop for the data and the outgoing port for the data) and the data plane 650 is in charge of forwarding that data. The control plane 610 includes the IGP (Interior Gateway Protocol) module 615 and the LDP (Label Distribution Protocol) Module 620. The IGP module 615 may be running a link-state protocol such as OSPF (Open Shortest Path First) or IS-IS (Intermediate System to Intermediate System), or running another protocol such as RIP (Routing Information Protocol). The IGP module 615 communicates with other network elements to exchange routes and select those routes based on one or more routing metrics. The IGP routes that are selected are stored in the RIB (Routing Information Base) 625. The IGP module 615 can also cause the route entries which are not selected and stored in the RIB 625 to be stored in a local RIB (e.g., an IGP local RIB).

The LDP module 620 exchanges label mapping information with its peers (LDP peers). For example, the LDP module 620 may generate label mapping messages and receive label mapping messages from its peers. The LDP module 620 relies on the underlying routing information provided by the IGP module 615 to the RIB 625 in order to forward label packets. The LDP module 620 allocates labels and stores other information related to forwarding label packets (e.g., NHLFE information, ILM (Incoming Label Map) information, FTN information) in the MPLS information base 630. The LDP module 620 includes the LDP-FRR module 622 which extends the functionality of the LDP module 620 to support the LDP-FRR process described herein. In one embodiment, the LDP-FRR module 622 performs the operations described in FIGS. 3 and/or 5.

The control plane 610 programs the data plane 650 with route information based on the RIB 625 and the MPLS information base 630. Specifically, certain information from the RIB 625 is programmed to the FIB (Forwarding Information Base) 655 and certain information from the MPLS information base 630 is programmed to the ILM structure 660, the NHLFE structure 665, and the FTN structure 670. For example, the alternative labels for the BSP LSPs are programmed to one or more of the ILM structure 660 and the NHLFE structure 665 of the data plane 650 as appropriate such that if the failure occurs, the traffic can be re-routed according to the BSP LSPs quickly (e.g., at line rate).

In one embodiment the network element 600 includes a set of one or more line cards (sometimes referred to as forwarding cards) and a set of one or more control cards. The set of line cards and control cards are coupled together through one or more mechanisms (e.g., a first full mesh coupling the line cards and a second full mesh coupling all of the cards). The set of line cards typically make up the data plane and may each store the FIB 655, the ILM 660, the NHLFE 665, and the FTN 670 which will be used when forwarding packets. Specifically, the FTN 670 is used for forwarding packets that are unlabeled (e.g., they are received from outside the MPLS domain at the ingress LSR) but are to be labeled before forwarding. The ILM 660 is used for forwarding labeled packets. The control cards typically run the routing protocols including the IGP module 615, the LDP module 620, and store the RIB 625 and the MPLS information base 630.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a first network element for MPLS (Multi-protocol Label Switching) fast re-route using LDP (Label Distribution Protocol), wherein the first network element is one of a plurality of network elements in an MPLS network, the method comprising the steps of:
   receiving a first label advertised from a second network element in the MPLS network;
   computing a shortest path tree (SPT) to reach a destination network element under a selected failure condition that may potentially occur on the MPLS network, wherein the second network element is a nexthop of the first network element in the computed SPT and is not upstream from the selected failure condition;
   advertising a second label to a set of one or more third network elements for a backup LDP LSP (Label Switched Path) that will serve as a backup when the selected failure condition is realized, wherein the set of third network elements are upstream neighbor network elements on the computed SPT with respect to the first network element; and
   installing a swap action from the second label to the first label.

2. The method of claim 1, further comprising the steps of:
   receiving a packet from one of the set of third network elements that includes the second label;
   swapping the second label with the first label; and
   transmitting the packet to the second network element with the first label.

3. The method of claim 1, wherein the selected failure condition is a failure of one of a link downstream from the first network element and a network element downstream from the first network element.

4. The method of claim 1, wherein the first network element is a backup switched path merge point.

5. The method of claim 1, wherein the second network element is a first hop from the first network element on a current shortest path LSP that traverses the selected failure condition.

6. The method of claim 1, wherein the first label advertised from the second network element is used by the first network element when transmitting packets to the second network element irrespective of the selected failure condition.

7. A first network element for participating in MPLS (Multiprotocol Label Switching) fast reroute using LDP (Label Distribution Protocol) in an MPLS network, comprising:
   a set of one or more processors; and
   a control plane that includes an LDP module, that when executed by the set of processors, cause the set of processors to perform the following:
      receiving a first label advertised from a second network element in the MPLS network,
      computing a shortest path tree (SPT) to reach a destination network element under a selected failure condition that may potentially occur on the MPLS network, wherein the second network element is a nexthop of the first network element in the computed SPT and is not upstream from the selected failure condition,
      advertising a second label to a set of one or more third network elements for a backup LDP LSP (Label Switched Path) that will serve as a backup when the selected failure condition is realized, wherein the set of third network elements are upstream neighbor network elements on the computed SPT with respect to the first network element, and
      installing a swap action from the second label to the first label in one or more forwarding data structures in a data plane of the first network element.

8. The network element of claim 7, further comprising:
   the data plane that when executed by the set of processors, further cause the set of processors to perform the following:
      receive a packet from one of the set of third network elements that includes the second label;
      swap the second label with the first label using the one or more forwarding structures; and
      transmit the packet to the second network element with the first label.

9. The network element of claim 7, wherein the selected failure condition is a failure of one of a link downstream from the first network element and a network element downstream from the first network element.

10. The network element of claim 7, wherein the first network element is a backup switched path merge point.

11. The network element of claim 7, wherein the second network element is a first hop from the first network element on a current shortest path LSP that traverses the selected failure condition.

12. The network element of claim 7, wherein the first label advertised from the second network element is used by the first network element when transmitting packets to the second network element irrespective of the selected failure condition.

13. A method in a first network element for MPLS (Multiprotocol Label Switching) fast re-route using LDP (Label Distribution Protocol), wherein the first network element is one of a plurality of network elements in an MPLS network, the method comprising the steps of:
   computing a shortest path tree (SPT) to reach a destination network element under a selected failure condition that may potentially occur on the MPLS network;
   receiving a label from a second network element for a backup LDP LSP (Label Switched Path) that will serve as a backup when the selected failure condition is realized, wherein the second network element is an upstream neighbor network element on the computed SPT with respect to the first network element; and
   installing a failure trigger action for the selected failure condition to cause the received label to be used to send traffic to the second network element when the selected failure condition is realized.

14. The method of claim 13, further comprising the steps of:
   detecting a failure condition that corresponds with the selected failure condition;
   responsive to the step of detecting, rerouting traffic received from the second network element and destined for the destination network element to the second network element using the received label for the backup LDP LSP.

15. The method of claim 13, wherein the selected failure condition is a failure of one of a link downstream from the first network element and a network element downstream from the first network element.

16. The method of claim 13, wherein the first network element is a Point of Local Repair.

17. A first network element for participating in MPLS (Multiprotocol Label Switching) fast reroute using LDP (Label Distribution Protocol) in an MPLS network, comprising:
   a set of one or more processors; and
   a control plane that includes an LDP module, that when executed by the set of processors, cause the set of processors to perform the following:
      compute a shortest path tree (SPT) to reach a destination network element under a selected failure condition that may potentially occur on the MPLS network;
      receive a label from a second network element for a backup LDP LSP (Label Switched Path) that will serve as a backup when the selected failure condition is realized, wherein the second network element is an upstream neighbor network element on the computed SPT with respect to the first network element; and
      install a failure trigger action in a set of one or more forwarding structures in a data plane of the first network element for the selected failure condition to cause the received label to be used to send traffic to the second network element when the selected failure condition is realized.

18. The network element of claim 17, further comprising:
   the data plane that when executed by the set of processors, further cause the set of processors to perform the following:
      responsive to a detection of a failure condition that corresponds with the selected failure condition, reroute traffic received from the second network element back to the second network element using the received label for the backup LDP LSP.

19. The network element of claim 17, wherein the selected failure condition is a failure of one of a link downstream from the first network element and a network element downstream from the first network element.

20. The network element of claim 17, wherein the first network element is a Point of Local Repair.

* * * * *